(12) United States Patent
Khafizov et al.

(10) Patent No.: US 9,405,400 B1
(45) Date of Patent: Aug. 2, 2016

(54) METHOD AND APPARATUS OF PROVIDING AND CUSTOMIZING DATA INPUT TOUCH SCREEN INTERFACE TO MULTIPLE USERS

(75) Inventors: Farid Khafizov, Plano, TX (US); Margarita Khafizova, Plano, TX (US)

(73) Assignee: Open Invention Network LLC, Durham, NC (US)

( * ) Notice: Subject to any disclaimer, the term of this patent is extended or adjusted under 35 U.S.C. 154(b) by 582 days.

(21) Appl. No.: 12/822,297

(22) Filed: Jun. 24, 2010

Related U.S. Application Data

(60) Provisional application No. 61/317,800, filed on Mar. 26, 2010.

(51) Int. Cl.
*G06F 3/041* (2006.01)

(52) U.S. Cl.
CPC .................................. *G06F 3/0418* (2013.01)

(58) Field of Classification Search
None
See application file for complete search history.

(56) References Cited

U.S. PATENT DOCUMENTS

| | | | |
|---|---|---|---|
| 5,434,964 A | 7/1995 | Moss et al. | |
| 5,635,683 A * | 6/1997 | McDermott et al. | 178/19.04 |
| 5,673,403 A | 9/1997 | Brown et al. | |
| 5,847,706 A | 12/1998 | Kingsley | |
| 5,917,483 A | 6/1999 | Duncan et al. | |
| 7,353,458 B2 | 4/2008 | Maimstrom | |
| 2003/0189552 A1* | 10/2003 | Chuang et al. | 345/173 |
| 2006/0007177 A1* | 1/2006 | McLintock | 345/173 |
| 2009/0084612 A1 | 4/2009 | Mattice et al. | |
| 2009/0085877 A1 | 4/2009 | Chang et al. | |
| 2009/0143141 A1 | 6/2009 | Wells et al. | |
| 2009/0195518 A1 | 8/2009 | Mattice et al. | |

* cited by examiner

*Primary Examiner* — Christopher R Lamb
(74) *Attorney, Agent, or Firm* — Haynes and Boone, LLP

(57) ABSTRACT

A method and apparatus of interpreting a user's touch at a touch screen interface device is disclosed. One example may include instructing the user to draw a certain figure on the touch screen interface device, and detecting the user's touch on the touch screen interface device. Further operations may include identifying the user's touch as a plurality of coordinates within a predefined area designated as the user's interface device, and comparing touch strength pressure measurements of the user's touch coordinates with touch strength pressure measurement threshold values stored in a memory of a computing device. Additional operations may also include adjusting the touch strength pressure measurement threshold values based on the touch strength pressure measurements of the user's touch coordinates.

17 Claims, 8 Drawing Sheets

METHOD AND APPARATUS OF PROVIDING AND CUSTOMIZING DATA INPUT TOUCH SCREEN INTERFACE TO MULTIPLE USERS

CROSS-REFERENCE TO RELATED APPLICATIONS

This application claims the benefit of prior filed U.S. Provisional Application Ser. No. 61/317,800, filed on Mar. 26, 2010, incorporated herein by reference and relates to U.S. Provisional Application Ser. No. 61/317,741, filed on Mar. 26, 2010 and U.S. application Ser. No. 12/753,163 filed on Apr. 2, 2010 and U.S. Ser. No. 12/753,167 filed on Apr. 2, 2010 and U.S. Ser. No. 12/753,171 filed on Apr. 2, 2010 and U.S. Ser. No. 12/753,180 filed on Apr. 2, 2010 and U.S. Provisional Application Ser. No. 61/317,744 filed on Mar. 26, 2010 and U.S. application Ser. No. 12/770,944 filed on Apr. 30, 2010 and U.S. application Ser. No. 12/770,965 filed on Apr. 30, 2010 and U.S. Ser. No. 12/770,974 filed on Apr. 30, 2010 and U.S. Provisional Application Ser. No. 61/317,812 filed on Mar. 26, 2010 and U.S. Provisional Ser. No. 61/317,827 filed on Mar. 26, 2010 and U.S. Provisional Application Ser. No. 61/317,793, filed on Mar. 26, 2010, each of which is incorporated herein by reference.

TECHNICAL FIELD OF THE INVENTION

This invention relates to a method and apparatus of receiving data from touch sensitive interfaces of multiple users. In particular, the present invention includes a method and apparatus to configure user data input interfaces based on customized user options.

BACKGROUND OF THE INVENTION

Touch sensitive screens are rapidly gaining popularity among users of interactive computing devices. Corporations, such as, Apple®, RIM®, Google® and Microsoft® have developed a large number of devices and/or applications that rely heavily on touch sensitive user interfaces. One particular area of increasing interest within the realm of touch sensitive user interfaces are multi-user (MU) touch detection and touch sensitive user interfaces.

In one example, a touch-screen may be a user display device that is configured to detect the presence and location of a user initiated touch gesture within the display area of the device. The ability to manipulate information by touching a screen provides an easy and intuitive way of operating a computing device. With recent reductions in the price of such touch-screen devices, large touch-sensitive screens are expected to become increasingly popular in business, education, and for retail customers.

A new trend in touch sensitive display technology is to have large tabletop displays, which are viewable by multiple viewers. Examples of these large displays may include a "Collaboration Wall®" from Perceptive Pixel®, and other devices associated with Microsoft's "Surface Project®". The collaboration wall is a large (81"×48") monitor developed by Perceptive Pixel, which was initially developed for military applications. The collaboration wall has received most of its publicity because of its use by the CNN® news network during its coverage of the 2008 U.S. Presidential election.

Such large displays provide new methods of data manipulation. For example, one or more users can move objects or other data illustrated on the display screen and/or manipulate information on the display screen in an interactive and intuitive way that is viewable to others.

Researchers of such touch-screen devices continue to innovate new ways to improve the touch-screen operation experience for tabletop and related wall-mounted displays. However, there are numerous design challenges and dilemmas that must be addressed in the creation of such displays. These problems include but are not limited to, how to detect intended touch from unintended (accidental) touch, how to identify multiple simultaneous touches by one or more users, how to improve the responsiveness of the computing devices to the various touch input signals received, etc.

Another example operation of the multi-touch display is with the arts, which have portrayed potential uses of such multi-touch technology as being the future of multi-user communication tools. For example, the 2002 science-fiction film "Minority Report©" provided different multi-touch features such as enlarging and moving objects around the display area. Additionally, the television series "CSI: Miami©" introduced both surface and wall displays, similar to Microsoft's surface project, in its sixth television season. Another form of a multi-touch computer display was included in the motion picture "The Island©", where the "professor" has a multi-touch desktop device that he uses to organize files, which was based on an early version of Microsoft's surface technology. Such technology can also be seen in the film "Quantum of Solace©."

Wide availability of large touch sensitive screens makes it possible for two or more users to collaborate and work together using a single touch sensitive screen. With the increasing adoption of touch screens, and, more particularly, multi-user touch screens, an increase in the performance and usability of detecting and interpreting inputs from multiple users is necessary to keep up with the increased demand of such devices.

In addition, setting up and designating certain areas of a touch screen may be necessary to accommodate the specific requirements of a particular user. For example, a simple default shaped rectangle may be used to offer a user a workspace. However, users may require additional options to change the shape and size of their respective workspace. Furthermore, the touch behavior of various users may be different for each user. Therefore, it may be necessary to determine the specific touch characteristics of a given user.

SUMMARY OF THE INVENTION

Example embodiments of the present invention include a method, apparatus and computer readable storage medium configured to provide interaction between two or more users of an application via touch screen interface devices.

One example embodiment of the present invention may include a method of interpreting a user's touch at a touch screen interface device. The method may include instructing the user to draw a certain figure on the touch screen interface device, detecting the user's touch on the touch screen interface device, and identifying the user's touch as a plurality of coordinates within a predefined area designated as the user's interface device. The method may also include comparing touch strength pressure measurements of the user's touch coordinates with touch strength pressure measurement threshold values stored in a memory of a computing device, and adjusting the touch strength pressure measurement threshold values based on the touch strength pressure measurements of the user's touch coordinates.

Another example embodiment may include an apparatus configured to interpret a user's touch at a touch screen interface device. The apparatus may include a processor configured to instruct the user to draw a certain figure on the touch screen interface device. The apparatus may further be configured to detect the user's touch on the touch screen interface device, identify the user's touch as a plurality of coordinates within a predefined area designated as the user's interface device, and compare touch strength pressure measurements of the user's touch coordinates with touch strength pressure measurement threshold values. The apparatus may further include a memory configured to store the touch strength pressure measurement threshold values. The processor may further be configured to adjust the touch strength pressure measurement threshold values based on the touch strength pressure measurements of the user's touch coordinates.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings described briefly below.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and computer program product embodied on a computer readable storage medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

While the invention is being described in the foregoing context, it is not meant to be limiting as those skilled in the art will appreciate that several of the acts and operations described hereinafter may also be implemented in hardware and/or software.

Example embodiments of the present invention describe methods and related apparatuses to provide effective interaction of two or more users via a touch-screen interface on the same or several computing devices. Such example embodiments may include touch sensitive interfaces configured to be used by multiple users and corresponding computer applications. Such configurations support multi-user touch detection on the same touch sensitive screen, or, alternatively via a plurality of screens connected to a single touch-sensitive signal controller. For example, multiple touch sensitive screens can operate together to create one virtual large touch sensitive screen. Furthermore, the example embodiments of the present invention are not limited only to tabletop touch sensitive screens.

Figure 1A:
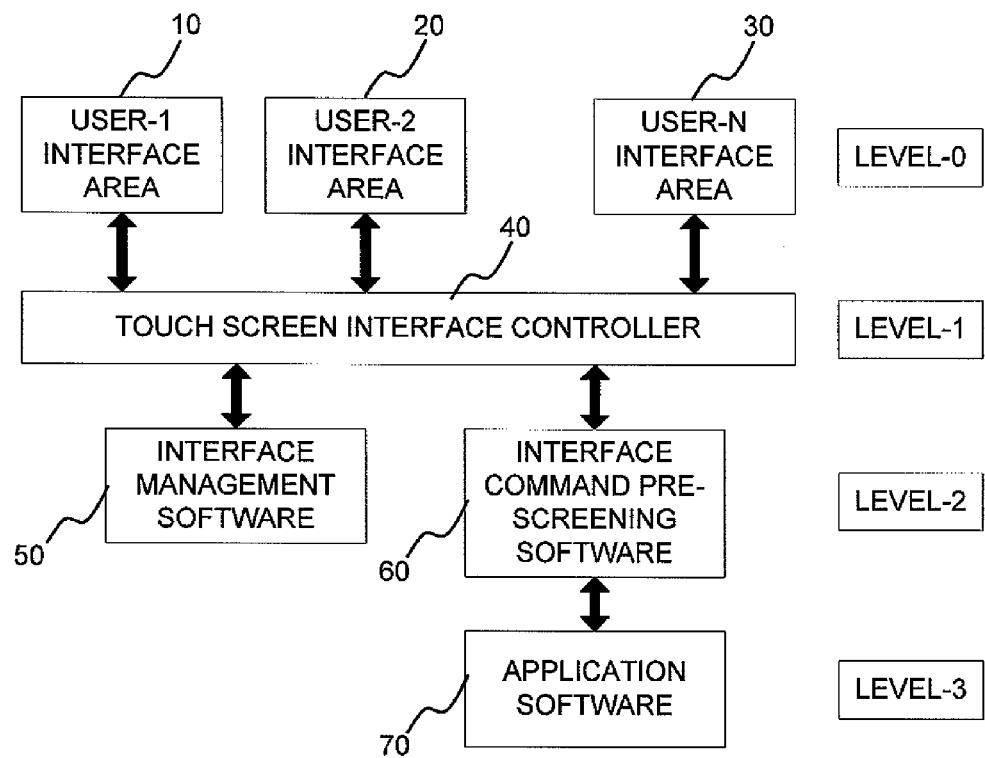
FIG. 1A is a block diagram, according to an example embodiment of the present invention.

FIG. 1A illustrates an example configuration of multiple users providing data input via a common touch screen interface controller, according to an example embodiment of the present invention. Referring to FIG. 1A, the touch screen configuration may be viewed as a multilayer configuration starting from a user interface 10-30 (level 0), and continuing with a touch screen interface controller 40 (level 1), auxiliary interface software, which includes interface management software 50 and interface command pre-screening software 60 (level 2), and also including application software 70 (level 3). Levels 0-2 provide a user interface, controller and software interface that offers multiple users with the ability to provide data input in a collaborative effort.

Some example embodiments of the present invention may provide a plurality of pre-existing and potentially new applications, such as, table games, art projects, landscape design, software architecture design, etc. These applications may be associated with touch-sensitive screen interfaces that are used to offer multiple users the ability to play and work together. In order to utilize touch sensitive interface(s) effectively, a configuration and method are needed to effectively coordinate data manipulation in a multi-user working environment, to allow quick addition of new applications, and to open multiple windows by the participants of the game/project.

According to one example embodiment of the present invention, user initiated touch commands may be detected as being displayed on the screen of the user interface device without linking the detected touch commands as actual commands. For example, consider a team of landscape architects as users working jointly on a single project. Each participant may work at his or her own user interface screen display device designing a particular image or set of images denoted as a "proposal." Once that particular user has finished his or her proposal by inputting ideas via the touch-sensitive interface, the user may select a "finished" or "submit" option to allow the other team members to view the proposal. At this point, the other members of the team will be able to view the proposal, and may continue doing so throughout the additional alterations of the design.

In another example, the submitted proposal may be canceled if there is no consensus among the participants of the project. For example, the participants may be prompted to vote out or accept portions of the submitted project being conducted by individual members. The moderator or leader may have ultimate authority to agree or disagree with the group. Or, alternatively, the majority of votes among the users may be decisive if the configuration is setup to include a democracy-type voting scheme.

The project leader, or the actual user proposing a particular design may decide to revert back to a previously saved design or abandon the current design by performing a "roll it back" command. In order to accomplish such a task, the configuration of the design layout application must be capable of displaying the current design efforts without actually committing to any proposed changes. Such a configuration may be implemented by a state machine diagram of the touch-command detection controller's operation along with its corresponding application.

Another example embodiment of the present invention may include sub-teams of a larger team working on a single project. The sub-teams may work in smaller groups on these smaller parts of the larger project.

In another example embodiment of the present invention, the history of touch commands made by each user is retained and stored in memory. When a particular sequence of commands becomes repetitive based on previous instances of commands, the user may take advantage of prompts offered by the application to reduce the amount of time used to recreate a particular design scenario.

Example embodiments of the present invention provide one or more users with a touch sensitive interface. Examples include, but are not limited to the following touch sensitive technologies: resistive, surface acoustic wave, capacitive, projected capacitance, infrared, strain gauge, optical imaging, dispersive signal technology, acoustic pulse recognition.

Currently, there is a large number of existing (e.g., table games) and potential new applications, such as, a "collaboration wall" (e.g., art design projects, digital content creation, etc.) for which touch-sensitive screen interfaces are a natural choice. Example embodiments of the present invention provide interaction of two or more users via a touch-screen interface on the same and/or several computing devices. Multiple touch sensitive screens can act as one virtual large touch sensitive screen. Therefore, the example embodiments of the present invention are not limited only to tabletop touch sensitive (TS) screens.

In order to provide touch sensitive interfaces to multi-user applications, there should be a configuration supporting multi-user touch detection on the same touch sensitive screen or a host of screens connected to a single touch-sensitive signal controller.

One example embodiment of the present invention may include multi-touch configurations that include a touch screen (e.g., screen, table, wall, etc.) and/or a touchpad, as well as a software application that recognizes multiple simultaneous touch points initiated by various users. Multiple touch points being performed in sequence, simultaneously, or, in a particular time frame may be recognized by the touch device through a variety of different technologies not limited to: heat sensing, finger pressure, high capture rate cameras, infrared light, optic capture, tuned electromagnetic induction, ultrasonic receivers, transducer microphones, laser rangefinders, and shadow capture.

A touch sensitive screen, also known simply as a "touch screen" may be a display configured to detect the presence and location of a touch within the display area. Even though touch screens can sense passive objects, such as a pen-shaped stylus, touch screens may also detect touch or contact to the display device by a finger or hand. Touch screens enable a user to interact with what is displayed directly on the display screen, and, at a point on the touch screen where an object is displayed. Such displays can be attached to computers and/or as terminals communicatively coupled to other computers and networks. Touch screens may also be used with digital appliances, such as, the personal digital assistant (PDA), satellite navigation devices, mobile phones (Iphone®), and video games.

There are a number of common types of touch screen technologies including resistive, surface acoustic wave, capacitive, projected capacitance, infrared, strain gauge, optical imaging, dispersive signal technology, and acoustic pulse recognition. Each of these technologies has its own advantages and disadvantages. For example, in resistive technology, the touch screen panel may be composed of several layers, the most important of which are two thin, metallic, electrically conductive layers separated by a narrow gap.

Resistive touch screens may be configured to support multi-touch. Surface acoustic wave (SAW) technology uses ultrasonic waves that pass over the touch screen panel. When the panel is touched, a portion of the wave is absorbed. This change in the ultrasonic waves registers the position of the touch event and sends this information to the controller for processing.

In the descriptions that follow, the example embodiments of the present invention are described with reference to acts and symbolic representations of operations that are performed by one or more computing devices, unless indicated otherwise. Therefore, it will be understood that such acts and operations, which are at times referred to as being computer-executed, include the manipulation by a processor of the computing device of electrical signals representing data in a structured form, which may also be stored in a tangible storage memory.

Figure 1B:
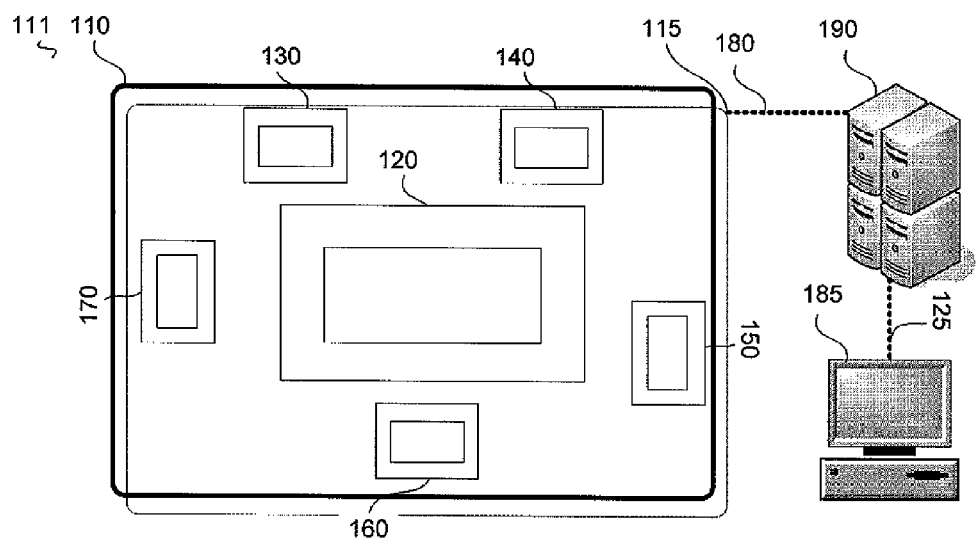
FIG. 1B is a touch screen configuration where multiple users have concurrent access to a touch sensitive interface, according to an example embodiment of the present invention.

FIG. 1B illustrates a large touch screen 110 that may be used concurrently by multiple users, according to an example embodiment of the present invention. Referring to FIG. 1B, an example of a computing environment 111 is illustrated with a large touch sensitive screen computing device 110 being used concurrently by multiple users working jointly on the same project at workstation computing devices 130, 140, 150, 160 and 170 (i.e., computers, handheld computing devices, etc.).

In one example, multiple users may be working on a joint landscape design. Assuming a group leader has assigned each of the user's a different portion of the project (i.e., sub-projects), then the users may design their portion on their own respective workstations 130, 140, 150, 160 and/or 170. The joint project screen 120 may be a larger screen that is configured to display the entire efforts of all users during project efforts and after project completion.

While designing the landscape one user may be assigned a zone section of the project, such as, the stone walkway at the top center portion of the customer's backyard. Other users may design a non-location specific portion of the landscaping, such as, a playground, which the users may then move around the layout illustrated on the main project screen 120 until a final decision is rendered. This example design may instead be a table game, such as, Monopoly®, where all the users are seated around a larger screen and interface via their own computing devices 130-170.

The project screen's entire area may be touch sensitive and can be used to pass commands through the touch detecting mechanism at the surface of the screen 110 to the controller portion of the screen 115. FIG. 1B illustrates a darker line 110 which represents the surface and touch area of the screen and the controller circuitry 115 is illustrated by the thinner line 115 and may be located below the surface of the touch screen 110. Details of the touch screen's circuitry and controller 115 have been omitted from further detail. The defined areas 120, 130, 140, 150, 160 and 170 may be virtual screens that are part of the larger screen 110.

Referring to FIG. 1B, shown schematically below the surface 110, the area of the screen 120 may be divided into several viewing areas which are based on the content of the user display screens 130, 140, 150, 160 and 170 (in this example we assume that we have five users). The content of the user display screens 130-170 may be recognized by the controller 115 as touch sensitive input interface areas for each participant of the project. Results of the joint work are reflected on the surface area of the joint screen 120, but may also be replicated by the application in each of the individual input areas 130, 140, 150, 160, and 170. Thus, each user may be able to see a copy of the joint project in their respective input areas.

Applications that can utilize such a touch sensitive multi-user interface include but are not limited to table games, landscape design, and software architecture design. Each participant can make changes to the project through the visual and intuitive touch sensitive interfaces 130-170 as if the whole team was working with real objects. Each users' input is passed from the controller 115 to the computing device 190 through the communication link 180, which includes but is not limited to a wire-line connection, such as, Ethernet, a wireless connection (Bluetooth, WiFi, etc.), or any other connection supporting information exchange between the controller 115 and computing devices 190, such as the Internet.

Computing device 190 interprets signals detected and passed by the controller 115 as commands to move objects illustrated on the screen 120. Once a signal detected by the controller 115 is received and interpreted by the computing device 190, the objects may be moved or re-arranged according to the users' instructions reflected in their corresponding input areas 120, 130, 140, 150, 160 and 170. The auxiliary computing device 185 may be used to configure the computing device remotely via a communication link 125.

Figure 1C:
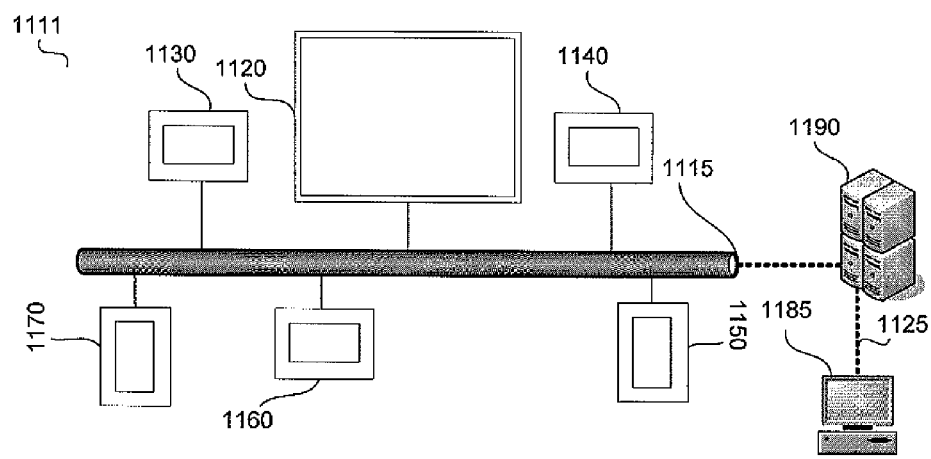
FIG. 1C illustrates a touch screen configuration where multiple users have concurrent access to a touch sensitive interface via physically separate devices and, therefore, form together a virtual large touch screen configuration similar to the one illustrated in FIG. 1B, according to an example embodiment of the present invention.

Another example multi-user configuration utilized in embodiments of the present invention is presented in FIG. 1C. Referring to FIG. 1C, a computing environment 1111 is illustrated as having a large virtual touch sensitive screen 1120 whose content is based on the input formed by multiple devices with smaller sized touch sensitive screens communicatively coupled to the same controller 1115. Touch sensitive interfaces of devices 1130, 1140, 1150, 1160, 1170, provide an input touch screen so that the results of the joint work may be reflected on screen 1120. All user devices 1130-1170 are connected through their respective controllers (not shown in the figure) to a common controller 1115 (illustrated as a bus of a common computing device). The same main computing device 1190 can be pre-configured through the auxiliary computing device 1185 via communication link 1125.

It should be noted that in FIG. 1C, each of the separate user devices 1130, 1140, 1150, 1160, 1170 can be a touch sensitive screen of another table-top, laptop, PDA, cell phone, etc., and the links connected each device to the main computing device 1190 can be through the LAN network or other known communication interfaces which include, but are not limited to Bluetooth, infrared, Wi-Fi, etc. The users do not need to be located around the same room or table but may be located on other sides of the globe communicatively linked through the Internet. According to example embodiments of the present invention, the configurations illustrated in FIG. 1B and/or FIG. 1C permit collaboration of sub-teams of users working jointly on the same project. The users may work independently without interaction or together in active communication with one another to contribute to a larger project.

According to example embodiments of the present invention, each of the users' own input areas may be dedicated areas providing a touch sensitive interface. These areas can be pre-configured and/or modified by the user and/or the group leader. For example, the size of the touch screen area may be configured through the computing device 185, which is communicatively coupled via a link 125 with the main computing device 190. The configuration commands may be processed by the main computing device, which, in turn, is configured to draw the boundaries and size of each of the users' touch sensitive interfaces 130-170 on the larger touch screen interface screen 110. The link 125 can be a wire-line connection, such as Ethernet, wireless connection, such as, Bluetooth, WiFi, 802.x etc., or any other connection supporting information exchange between the computing devices of the controller 115 and main computing device 190, such as, for example, via the Internet.

In another example embodiment, the number of input areas or windows, their size, shape and location may be determined automatically based on the number of users and the nature of the application. The rules used to define the user input areas may be stored in the main computing device 190. For example, some applications may allow each user to take up to 50% of 1/N of the total surface area, where N is the number of users. Each user can change the size of the window, however, he or she will not be able to extend the size of the window beyond a threshold value designated by a predefined rule.

The location of the window may be determined by the type of application and the type of user. For example, assuming that two or more users are playing a competitive card game where some of the information should not be shared by the players, the system will automatically generate two windows, or one window split into two parts for each user. One window will be used to allow the user to perform a selection and view a common picture seen by all players, the other window will be used for private viewing privileges, such as, the individual player's cards that each player does not what the other players to view.

While each of the players' windows may be located next to each other, the players of the card game would prefer to be seated as far apart as possible, and therefore the system will automatically maximize the distance between the players based on the location of their windows. Conversely, if the users are collaborating on a joint project design, and, especially, if they are part of a sub-team working on a smaller part of a larger project, the computing device (i.e., main computing device 190) will configure their respective input areas close to each other but far enough apart not to crowd the users to close to one another. In these examples, each user can further change the size, shape, and location of an input area as needed.

According to example embodiments of the present invention, each of the users' touch sensitive interfaces may be limited to the area where the user is located. For example, users may be sitting around a touch sensitive table, and it may not be necessary for a user to have access to all areas of the table to manipulate data. The other area of the table may be used by each participant to place their notes, pens, coffee mugs, and elbows on the table without interfering with the working space of the other users. In another example embodiment (not shown in the figures), each user can have several user interfaces open for different applications.

It should be noted that individual users' touch sensitive interface areas 130-170 illustrated in FIG. 1B do not need to be fixed. Once they are initialized each user can move their specific rectangle-shaped window around and can enlarge or reduce its size and area for ergonomic reasons. Each interface area is associated with a user (or users) and an application. A user can bring new windows around the main window of the application that he or she is working with at any given time. The user can also perform multitasking and/or use the additional windows to aid his or her main application. For example, the user can bring a set of objects that he may want to place in a separate window in an effort not to crowd the main application window area visible by all team members. However, if and when the user needs to add a new object into the main window, he or she can simply drag and drop the object from an auxiliary window into the main window.

Each user can define the shape of the window(s) he or she is using. The rectangular-shaped windows 130-170 illustrated in FIG. 1B serve only as one example and are not intended to limit the possibility of other window display configurations. For example, a user may find that a triangular-shaped window provides a more suitable arrangement to work with the objects currently displayed in the window while saving some space on the table-top.

Figure 2:
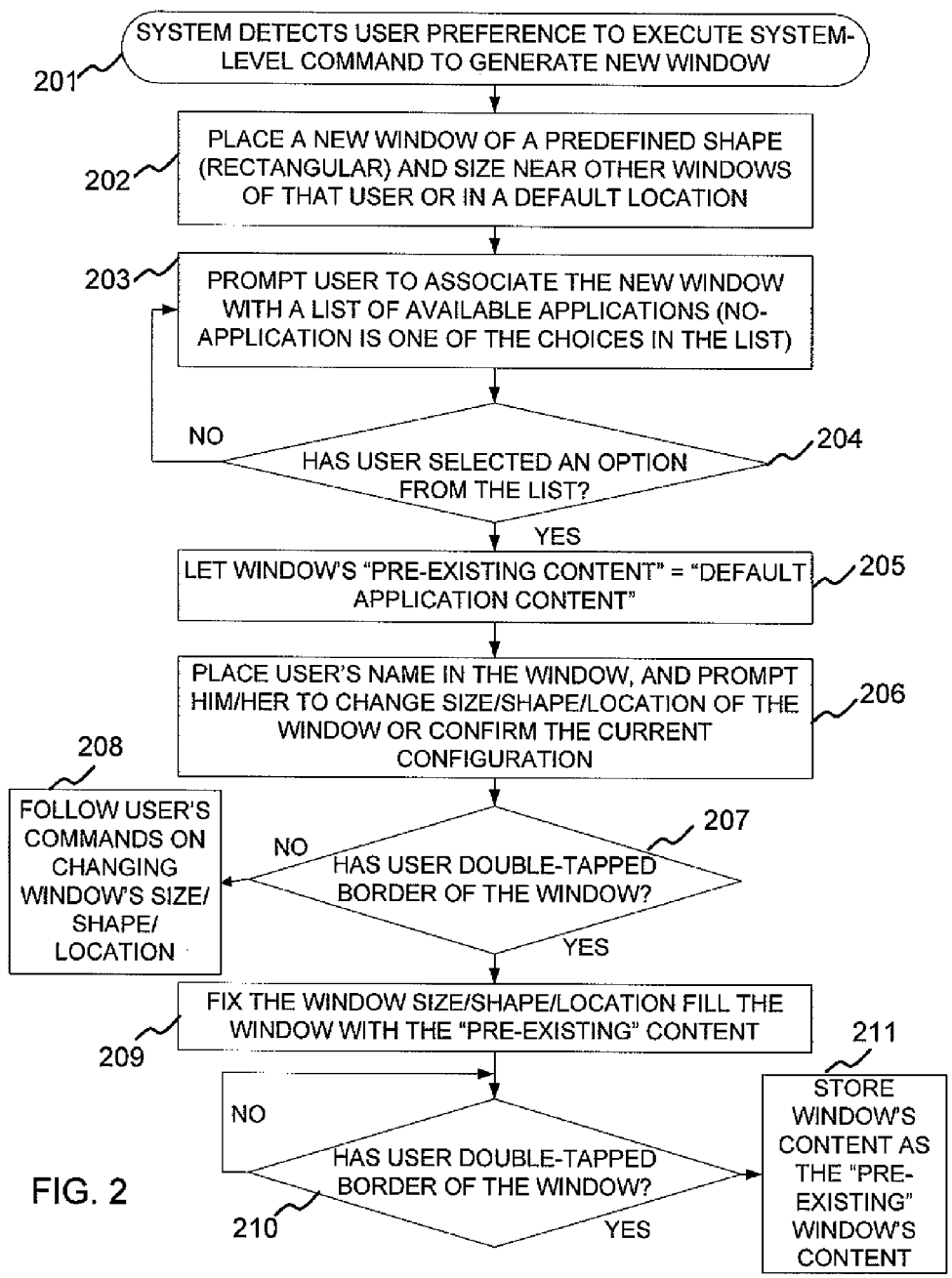
FIG. 2 illustrates a flow diagram illustrating the process of detecting a user's attempt to open a new window and/or modify the size of an existing window, according to an example embodiment of the present invention.

A message flow chart illustrating an example embodiment of the present invention is illustrated in FIG. 2. In this example, each user's configuration for the shape and size of a touch sensitive interface area is performed through the supporting computing device 185 and main computing device 190. The main computing device 190 stores pre-configured threshold values in a temporary storage area. The main computing device 190 also converts received information into commands recognized by the controller 115 and passes them to the controller 115. Controller 115 further executes commands necessary to draw the user touch sensitive interface in the designated area and outline the respective boundaries of the designated area.

FIG. 2 illustrates a flow diagram procedure that permits the user to modify the shape of an existing window or to create a new window, according to an example embodiment of the present invention. Referring to FIG. 2, the system detects a user preference to execute a system-level command to generate a new window at operation 201. A new window having a predefined shape (i.e., rectangle) and size, which may be based on previously placed windows, is then placed near the other windows a particular user, or, in a default location at operation 202. The user is then prompted to associate the new window with a list of available applications, or, alternatively no application at operation 203.

Continuing with FIG. 2, it is then determined whether the user has selected an option from the list at operation 204. If no option is selected the user is again prompted to associate the present window, and, if the user does perform a selection, the window's pre-existing content becomes the default application content at operation 205. The user's name is placed in the window, and the user is prompted to change the size/shape/location etc. of the window or confirm that the present configuration is acceptable at operation 206. The user may continue modifying the windows features by moving the window around via touching the user display interface at operation 208. When the user is satisfied, the border of the window may be double tapped at operation 207. The window is then fixed and filled with the pre-existing content in operation 209. If the user is satisfied another double tapping operation may be performed at operation 210, and the window's content may be stored in memory at operation 211.

Figure 3:
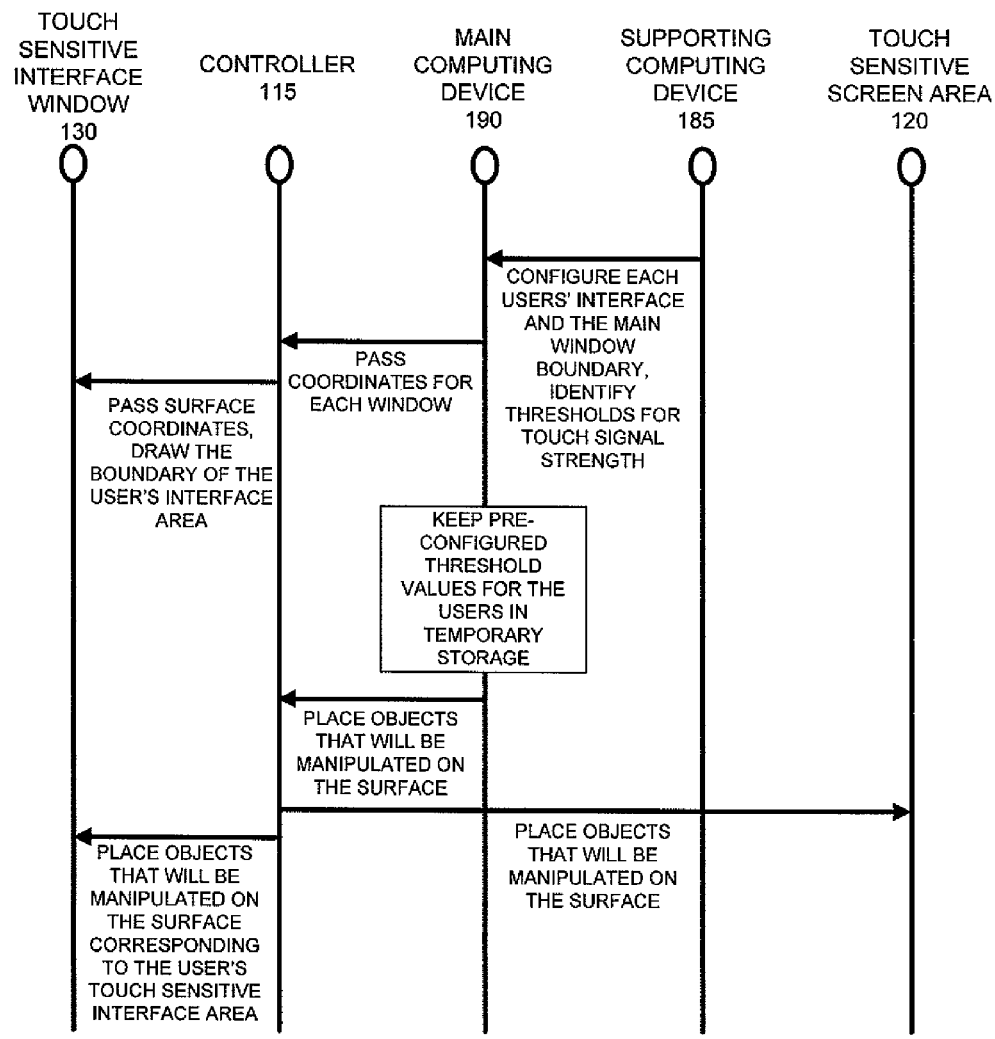
FIG. 3 illustrates a message flow diagram illustrating the flow of messages between nodes and devices during a pre-configuration stage, according to an example embodiment of the present invention.

In an effort to illustrate the communications between the various computational devices, a message flow diagram is illustrated in FIG. 3, according to example embodiments of the present invention. Referring to FIG. 3, the supporting computer device 185 (as illustrated in FIGS. 1B and 1C) sends information necessary to configure each users' interface and the main window boundary or group window (similar to main window 120 in FIGS. 1B and 1C). The information sent may also provide threshold data as to the touch signal strength of the users. The information may be sent to the main computing device 190, which communicates with the controller 115 of the touch screen interfaces by transferring the coordinates for each window being configured.

The controller 115 may then transfer the surface coordinates necessary to draw the boundary of the user's interface area to the touch sensitive interface window 130. The main computing device 190 may temporarily store in memory the pre-configured threshold values for the users, and transfer data to the controller 115 necessary to place the objects on the surface of the touch sensitive interface window 130 (i.e., application related objects, such as, menu options, profile data, project information, etc.). Additional objects may be placed on the main window 120 assuming it is designated as a master project window to include the data of each of the individual windows 130-170.

Figure 4:
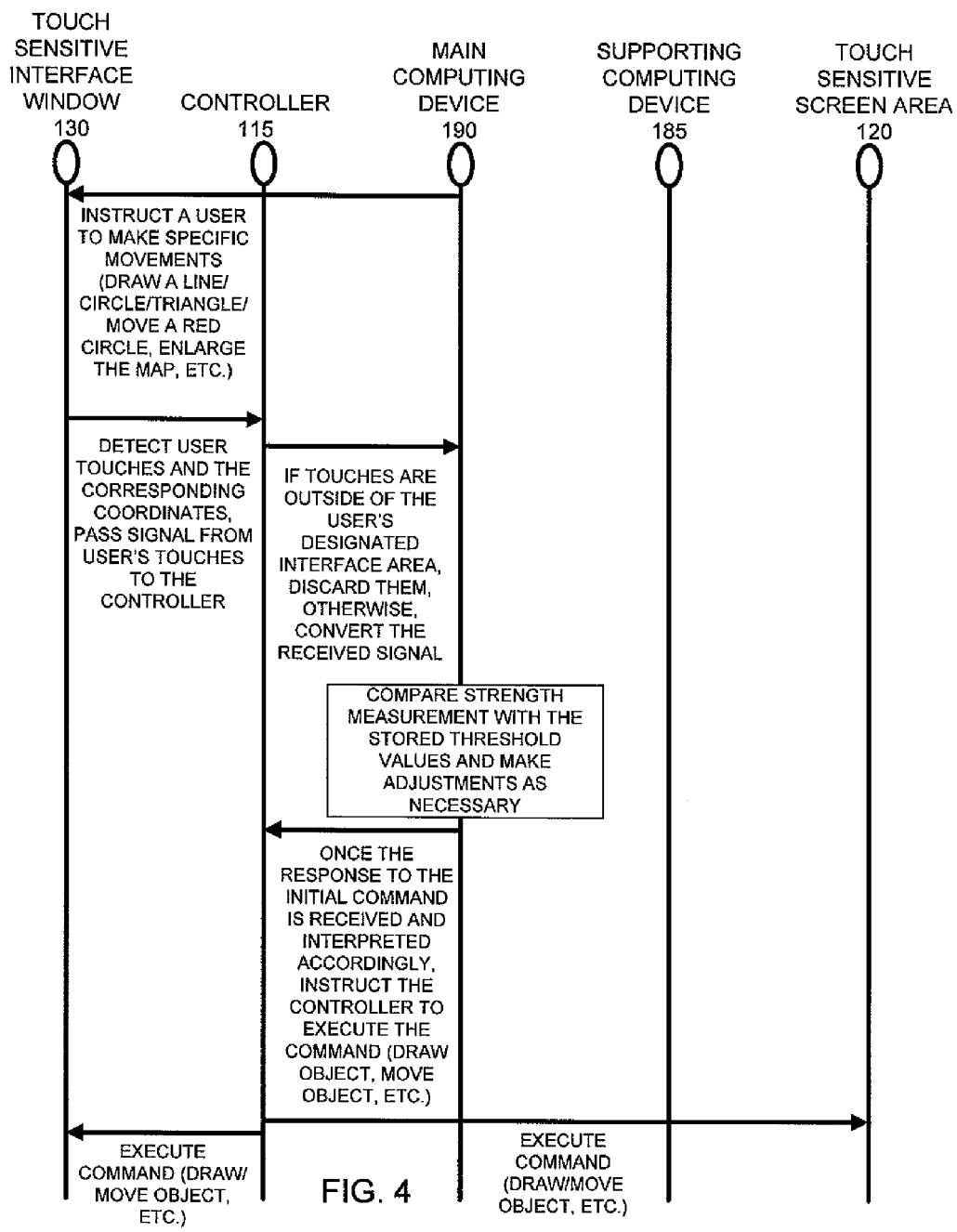
FIG. 4 illustrates another message flow diagram of messages communicated during a training and threshold adjustment operation, according to an example embodiment of the present invention.

FIG. 4 illustrates another message diagram that includes an example calibration and learning cycle of collecting data based on the user's touch characteristics, according to an example embodiment of the present invention. Referring to FIG. 4, the main computing device 190 instructs the touch sensitive interface window 130 to make specific movements, such as, draw a line, circle, triangle, etc., in order to begin the calibration and learning process of the user's touch characteristics.

The controller 115 detects the user's touches and corresponding coordinates and determines the pressure, speed, size and other related characteristics of the user's touching style, and, the controller discards all touching that is outside the designated area of the user based on the coordinate measurements of the user's predefined area. However, all touching inside the boundary of the user's touching area is forwarded to the main computing device 190, which compares the strength measurement with the stored threshold values and makes adjustments as necessary to accommodate the user's touching style.

Once the response to the initial command is received and interpreted, the main computing device 190 instructs the controller 115 to execute the command, such as, draw an object, move an object etc. The user's movement behavior is not originally available to the computing device 190 until the training cycle is complete. The commands executed by the user may be executed on the main touch sensitive screen 120 and/or the interface window of the user 130. The correspondence of the object drawn by the user and the object stored in the memory is based on a correlation of the measured coordinates of the object drawn by the user to a set of predefined coordinates stored in the memory.

The evaluation procedure includes comparing the geometry and coordinates of the actual measured points from the user's selections to the geometric figure or curve that was expected from the instruction. For example, if the user was instructed to draw a line, it is expected that the coordinates of points where a pressure signal was detected and measured will form a line. If a line is not drawn and the measurements detected fail to be complied by the computing device as an acceptable line, the measurement may be disregarded and a repeat attempt may be offered to the user. For example, the user may be informed of failed attempt(s) and asked to repeat the command.

For the received data points that passed the evaluation procedure, each point's pressure strength value is compared with the corresponding threshold values. According to an example embodiment of the present invention, for a given geometric figure/curve, the average pressure value of all the measured points forming the figure/curve may be calculated and used as a new threshold value. If the measured pressure value is below the pre-configured threshold value, the user may be asked to repeat the same command "N" times, where N is a configurable parameter that can be adjusted as needed. After N measurements have been conducted, the computing device may store the lowest value of the pressure measurements as the corresponding threshold value.

Since various users working jointly on the same project may be applying different touching pressure while working with the touch sensitive interface, each of the users' input gestures must be interpreted differently. The touch detection interfaces are configured for each user individually based on specific threshold value(s). Also, the touch detection interfaces are trained to recognize input commands through successive input attempts during the training phase of the application. Alternatively, the input commands of the multiple-users may be measured as a group, which are used to create specific threshold value(s).

In order to identify and authorize the individual users, each user can swipe his or her thumb, or any other predefined finger, over the top of a display device that can read fingerprints. In other embodiments, any other known form of biometric data can be used such as iris/eye recognition, voice recognition, heart beat recognition, etc. The fingerprint may be used to identify the user uniquely, and a biometric device can be communicatively coupled to any device in FIG. 1D to support fingerprint authorization. For example, the biometric device can be attached to the main computer 190, an auxiliary device, or can be made part of the table-top display device in one or more locations.

Once the user is identified, he or she can execute table-top system-level commands, such as, for example, "open a new window." Such a command request prompts a window to appear near the area designated for that user. The window may also include the user's personal identifier, such as, the user's name, ID, device(s) IP address, email address, etc. The user's identifier illustrated in the window indicates that the user can define at least one of the shape, the size, the color, the sound, the location, and any other attribute of that window.

Once the user is satisfied with the window's configuration, he or she can provide a command to the controller and/or main computing device, such as, for example, double tapping the border. This action taken by the user will cause the window to be fixed. If the user needs to change the window size, shape, etc., again in the future, he or she will conduct this process again.

According to another example embodiment of the present invention, the user may be recognized through his or her unique touch sequence. For example, when users are added to an existing project, the user may be asked to enter a unique tapping (or touching) sequence in a specified area. For example, one user may choose three quick taps as a sequence that uniquely identifies him. Another person may choose to draw an "L" shape, etc, as their trademark identifier that can be used to authenticate them logging on to the system. When a user requests system-level access by performing an "open new window" command, the main computing device will prompt him to enter the unique touch sequence prior to providing the user with a new window display. It should be noted that user recognition can be combined with a full or partial biometric data reading configuration that combines one or more of the above noted authorization examples.

In another example embodiment, the users may be permitted to select similar touch sequences. For example, when the measurements cannot be used to uniquely identify the user entering a touch-type password, the user will be prompted with a list of all users matching the entered sequence, and the user can select his or her name from the list, or instruct the system to show more users if his name is not in the list.

Figure 5:
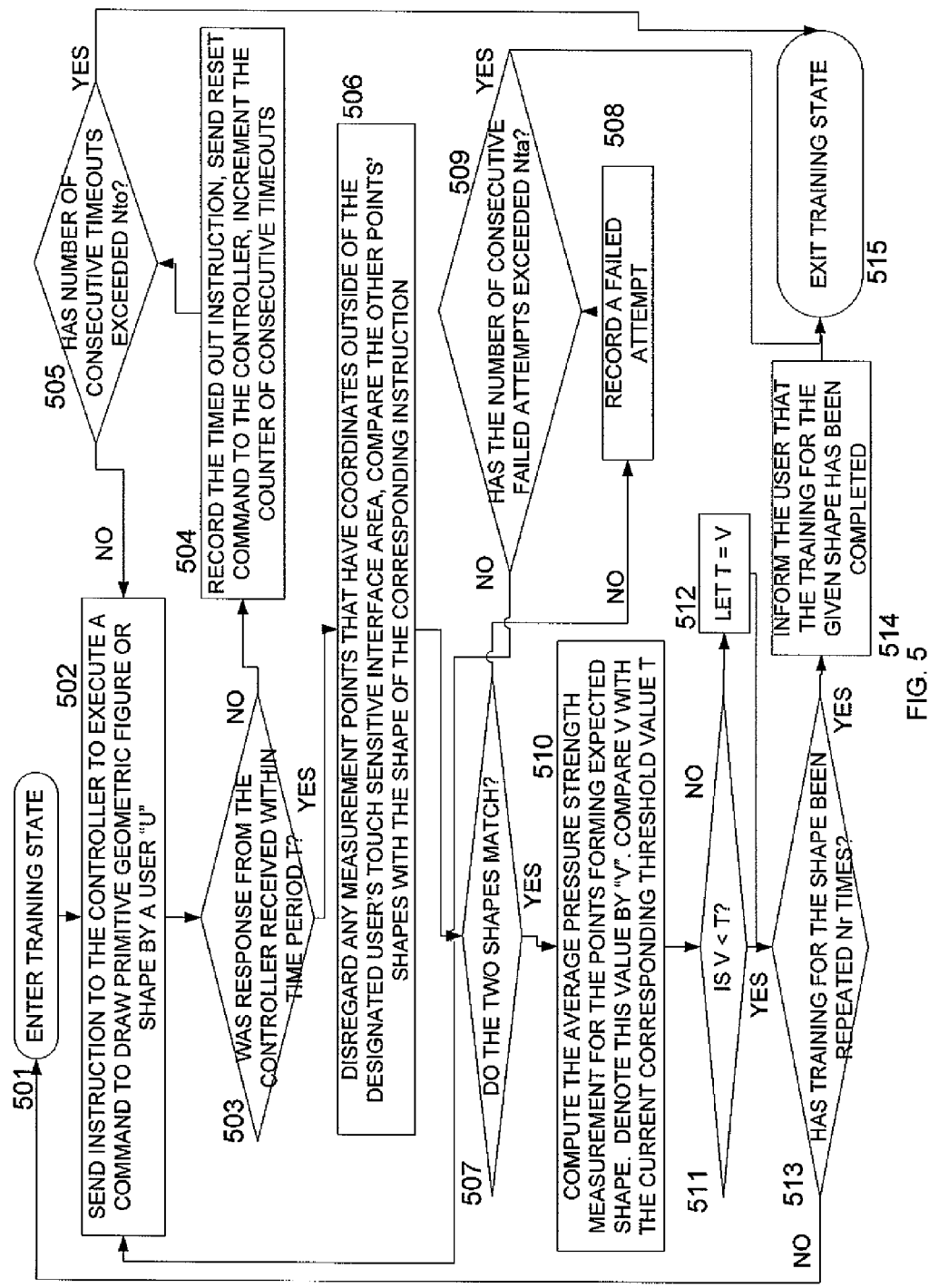
FIG. 5 illustrates a flow diagram of a training process to learn the user's manual input style and to adjust threshold values to determine intended touch commands, according to an example embodiment of the present invention.

FIG. 5 illustrates an example flow chart illustrating the method of calibrating the user's drawing technique for a particular shape, according to an example embodiment of the present invention. Referring to FIG. 5, the user may login or setup his or her touch screen interface device window and enter the training state at operation 501. The main computing device may send an instruction to the controller to execute a command to draw a primitive geometric figure or shape (e.g., square, triangle, straight line, etc.) by a user (denoted "U") at operation 502.

It is then determined whether the response was received within a specified time period "T" at operation 503, and, if not, the time-out is recorded, a reset is performed, and the counter is incremented accordingly at operation 504. If the number of consecutive timeouts has exceeded a pre-specified number then the training process ends, and, if not the instruction is resent and the procedure is started over at operation 505. Assuming at operation 504, the response was received with the time period T, the measurement points outside of the designated user's touch sensitive interface area are disregarded and the other points are compared to data pre-stored in memory to determine the accuracy of the user drawn shape at operation 506.

It is then determined whether the two shapes match (i.e., the user drawn shape and the shape stored in the memory) at operation 507. This type of calculation may be performed by simply comparing the coordinates of the user drawn shape to the distance and related coordinates of the pre-stored shape. If the shapes match to a degree of precision that is acceptable by the computing device application, then the average pressure strength of the user drawn shape is measured to determine a value "V" denoting the average pressure applied by the user on his or her touch screen device at operation 510. If the shapes do not match, the failed attempt is recorded at operation 508 and the number of consecutive failed attempts is measured against a threshold value "Nta" to determine whether to repeat the user drawing process at operation 502. If the number of failed attempts is beyond the threshold value "Nta", then training state is ended.

Once the value "V" is measured as the average pressure applied by the user on his or her touch screen device at operation 510, it is determined whether V is less than T at operation 511 and if so T is made equal to V at operation 512, and if not it is determined whether the training for the shape has been repeated a threshold number of "Nr" times at operation 513. If the training has not been repeated "Nr" times, then the training procedure is repeated. If the training has been repeated Nr times, then the user is informed that the training is complete for the given shape at operation 514 and the training state is completed at operation 515.

It should be noted that the training procedure may be configured to recognize the drawing of many different types of geometric figures and shapes, and various other commands executed from the touch sensitive user interface. The user may perform various different functions outside of his or her designated input area. For instance, while the user was responding to a command to draw a line, he or she could have touched the display surface with an elbow, etc. The touch detection system is capable of recognizing which touches correspond to a user's response to a given command, and which touches should be ignored.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 130, 140, 150, 160, 170, 185 and 190 and similar components in other drawings.

Figure 6:
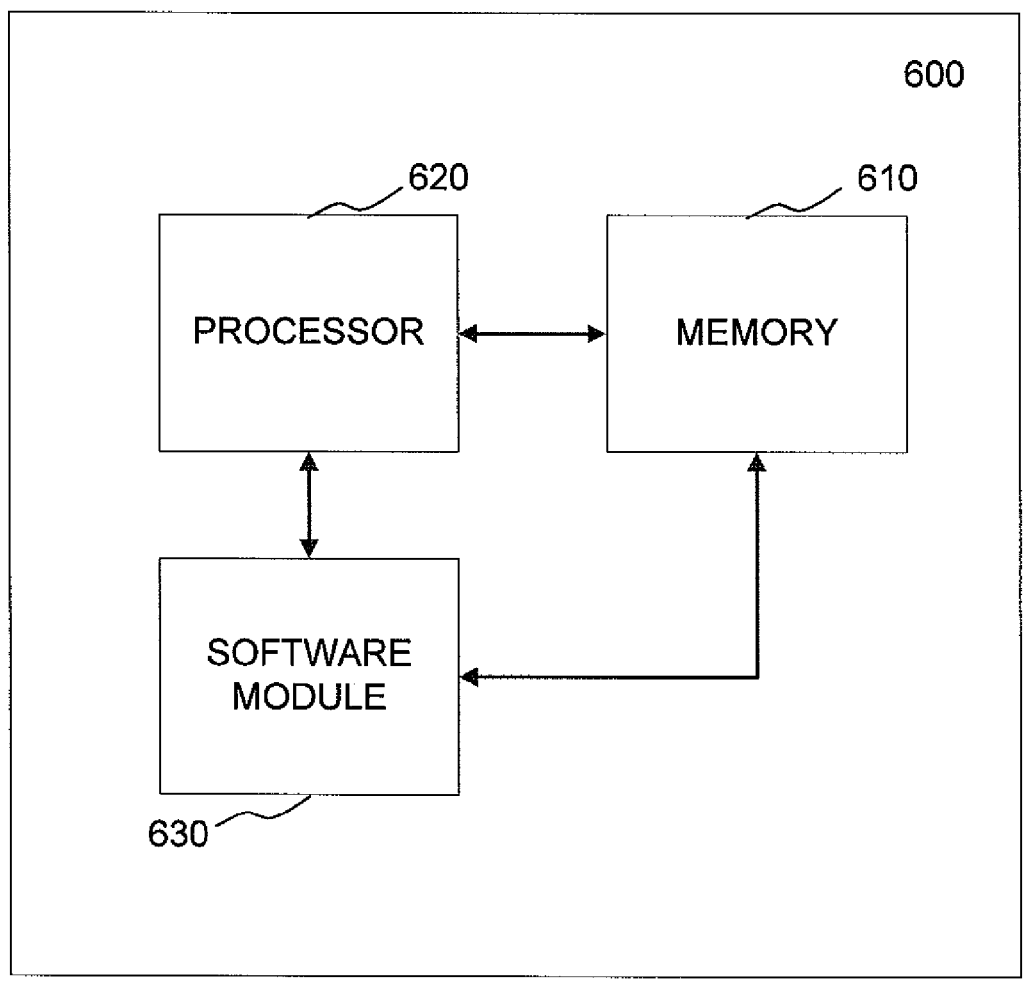
FIG. 6 is a network entity device that may embody computer program code that when executed performs one or more methods of the example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of interpreting a user's touch at a touch screen interface device, the method comprising:
   displaying instructions on the touch screen interface device instructing the user to draw a certain figure on the touch screen interface device;
   detecting the user's touch on the touch screen interface device;
   identifying the user's touch as a plurality of coordinates within a predefined area designated as the user's interface device;
   comparing touch strength pressure measurements of the plurality of coordinates with at least one touch strength pressure measurement threshold value stored in a memory of a computing device, wherein the touch strength pressure measurements comprise a plurality of pressure strength values corresponding to each of the plurality of coordinates;
   determining the plurality of coordinates match a predefined shape comprising a set of predefined coordinates stored in the memory to a predefined degree of precision as determined by a computing application by identifying locations of each of the plurality of coordinates on the touch screen interface device and measuring a distance of each of the plurality of coordinates to corresponding coordinates of the predefined shape;
   when the plurality of coordinates match the predefined shape to a predefined degree of precision, determining an average touch strength pressure measurement based on each of the plurality of coordinates forming the figure, wherein the average touch strength pressure measurement is determined by calculating an average of the plurality of pressure strength values; and
   designating the average touch strength pressure measurement as a new touch strength pressure measurement threshold value.

2. The method of claim 1, wherein the figure is at least one of a square, circle, rectangle and a straight line.

3. The method of claim 1, further comprising:
   discarding ones of the plurality of coordinates that are not within the predefined area designated as the user's interface area.

4. The method of claim 1, further comprising:
   instructing the user to redraw the certain figure on the touch screen interface device if the user's figure does not correspond with the figure stored in memory.

5. The method of claim 4, wherein the correspondence of the figure drawn by the user and the figure stored in the memory is based on a correlation of the measured coordinates of the figure drawn by the user to the set of predefined coordinates stored in the memory.

6. The method of claim 1, wherein the predefined area designated as the user's interface device is a portion of a larger display device area and may be customized to increase or decrease the portion of the larger display device area that is currently being occupied by the user's interface device.

7. An apparatus configured to interpret a user's touch at a touch screen interface device, the apparatus comprising:
   a processor configured to
   display instructions on the touch screen interface device to instruct the user to draw a certain figure on the touch screen interface device,
   detect the user's touch on the touch screen interface device,
   identify the user's touch as a plurality of coordinates within a predefined area designated as the user's interface device,
   compare touch strength pressure measurements of the plurality of coordinates with at least one touch strength pressure measurement threshold value, wherein the touch strength pressure measurements comprise a plurality of pressure strength values corresponding to each of the plurality of coordinates,
   determine the plurality of coordinates match a predefined shape comprising a set of predefined coordinates to a predefined degree of precision as determined by a computing application by identifying locations of each of the plurality of coordinates on the touch screen interface device and measuring a distance of each of the plurality of coordinates to corresponding coordinates of the predefined shape,
   when the plurality of coordinates match the predefined shape to a predefined degree of precision, determine an average touch strength pressure measurement based on each of the plurality of coordinates forming the figure, wherein the average touch strength pressure measurement is determined by calculating an average of the plurality of pressure strength values; and a memory configured to store the touch strength pressure measurement threshold values and the set of predefined coordinates, and
   wherein the processor is further configured to designate the average touch strength pressure measurement as a new touch strength pressure measurement threshold value.

8. The apparatus of claim 7, wherein the figure is at least one of a square, circle, rectangle and a straight line.

9. The apparatus of claim 7, wherein the processor is further configured to discard ones of the plurality of coordinates that are not within the predefined area designated as the user's interface area.

10. The apparatus of claim 7, wherein the processor is further configured to instruct the user to redraw the certain figure on the touch screen interface device if the user's figure does not correspond with the figure stored in the memory.

11. The apparatus of claim 10, wherein the correspondence of the figure drawn by the user and the figure stored in the memory is based on a correlation of the measured coordinates of the figure drawn by the user to the set of predefined coordinates stored in the memory.

12. The apparatus of claim 7, wherein the predefined area designated as the user's interface device is a portion of a larger display device area and may be customized to increase or decrease the portion of the larger display device area that is currently being occupied by the user's interface device.

13. A non-transitory computer readable storage medium configured to store a computer program that when executed controls a processor to perform interpreting a user's touch at a touch screen interface device, the processor being further configured to perform:

displaying instructions on the touch screen interface device instructing the user to draw a certain figure on the touch screen interface device;
   detecting the user's touch on the touch screen interface device;
   identifying the user's touch as a plurality of coordinates within a predefined area designated as the user's interface device;
   comparing touch strength pressure measurements of the plurality of coordinates with at least one touch strength pressure measurement threshold value stored in a memory of a computing device, wherein the touch strength pressure measurements comprise a plurality of pressure strength values corresponding to each of the plurality of coordinates;

determining the plurality of coordinates match a predefined shape comprising a set of predefined coordinates stored in the memory to a predefined degree of precision as determined by a computing application by identifying locations of each of the plurality of coordinates on the touch screen interface device and measuring a distance of each of the plurality of coordinates to corresponding coordinates of the predefined shape;

when the plurality of coordinates match the predefined shape to a predefined degree of precision, determining an average touch strength pressure measurement based on each of the plurality of coordinates forming the figure, wherein the average touch strength pressure measurement is determined by calculating an average of the plurality of pressure strength values; and designating the average touch strength pressure measurement as a new touch strength pressure measurement threshold value.

14. The non-transitory computer readable storage medium of claim 13, wherein the figure is at least one of a square, circle, rectangle and a straight line.

15. The non-transitory computer readable storage medium of claim 13, wherein the processor is further configured to perform:
   discarding ones of the plurality of coordinates that are not within the predefined area designated as the user's interface area.

16. The non-transitory computer readable storage medium of claim 13, wherein the processor is further configured to perform:
   instructing the user to redraw the certain figure on the touch screen interface device if the user's figure does not correspond with the figure stored in memory.

17. The non-transitory computer readable storage medium of claim 16, wherein the correspondence of the figure drawn by the user and the figure stored in the memory is based on a correlation of the measured coordinates of the figure drawn by the user to the set of predefined coordinates stored in the memory.

* * * * *